United States Patent [19]
Nicholls

[11] 3,831,919
[45] Aug. 27, 1974

[54] TELESCOPIC GAS SPRINGS
[75] Inventor: Lawrence George Nicholls, Birmingham, England
[73] Assignee: Girling Limited, Birmingham, England
[22] Filed: June 5, 1972
[21] Appl. No.: 259,578

[30] Foreign Application Priority Data
June 9, 1971  Great Britain................... 19658/71

[52] U.S. Cl. .............................................. 267/34
[51] Int. Cl. ............................................. F16f 9/24
[58] Field of Search ........................... 267/34, 65 R

[56] References Cited
UNITED STATES PATENTS
| | | | |
|---|---|---|---|
| 1,261,011 | 4/1918 | Cook | 267/34 |
| 1,574,000 | 2/1926 | Roberts | 267/65 R |
| 1,605,249 | 11/1926 | Loyd | 267/65 R |
| 1,876,145 | 9/1932 | McGrew | 267/34 |
| 2,048,418 | 7/1936 | Warren | 267/34 |
| 2,145,891 | 2/1939 | Rice, Jr. | 267/34 |

Primary Examiner—M. Henson Wood, Jr.
Assistant Examiner—Robert Saifer
Attorney, Agent, or Firm—Scrivener Parker Scrivener & Clarke

[57] ABSTRACT

A telescopic gas spring comprises a cylinder closed at one end, a piston slidable in the cylinder and a piston rod carrying the piston and extending sealingly through the other end of the cylinder. An auxiliary spring is disposed at the closed end of the cylinder and comes into operation as the piston approaches a position of full compression, to provide additional resistance to further compression of the gas spring. The auxiliary spring may be a coil spring or a gas spring.

2 Claims, 4 Drawing Figures

TELESCOPIC GAS SPRINGS

This invention relates to telescopic gas springs.

Telescopic gas springs are commonly used to assist in the opening of automobile bonnets and upwardly opening doors. Due to the geometry of the doors they are fitted to, it is difficult to obtain the desired rate of opening from the closed to the open position. More particularly, a higher thrust is required to raise the door through the first stage of opening than to continue opening the door. Furthermore, to avoid damaging the door when it is being closed, it is desirable to have some means to restrict the travel of the door as it approaches its closed position.

According to the invention, there is provided a telescopic gas spring comprising a cylinder closed at one end, a piston slidable in the cylinder, a piston rod carrying the piston and extending sealingly through the other end of the cylinder, and auxiliary biasing means which comes into operation as the piston approaches a position of full compression, to provide additional resistance to further compression of the gas spring.

Some forms of telescopic gas springs in accordance with the invention will now be described, by way of example, with reference to the accompanying drawings, in which.

Figure 1:
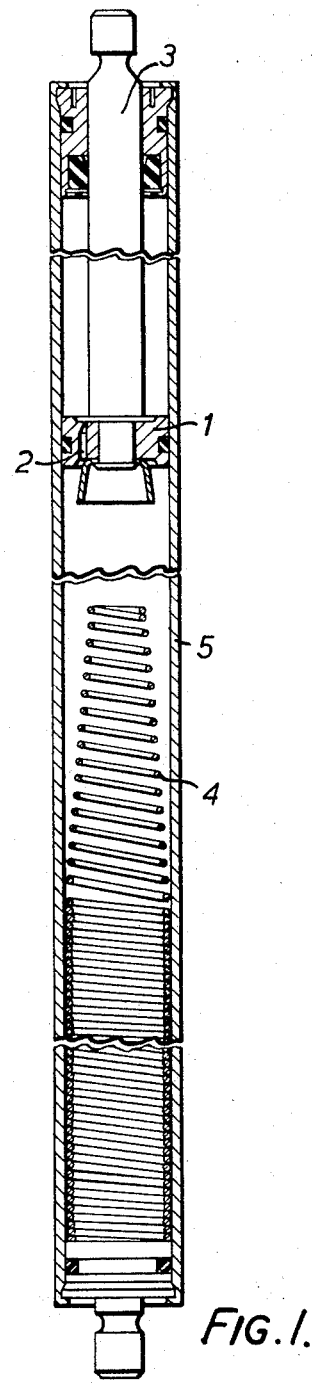
FIG. 1 is a cross-sectional view of one form of gas spring.

Referring to FIG. 1 of the drawings, a gas spring comprises a piston 1 secured to a piston rod 3. The piston 1 is provided with a damping orifice 2 and can be moved reciprocally in its cylinder 5. A conical spring 4 is positioned in the end of the cylinder 5 and can be compressed within itself so that no coils rub on the internal surface of the cylinder 5.

On compression, the piston 1 engages the conical spring 4 as it nears full compression. This further increases the resistance of the gas spring to compression and provides a "check" on the final compression of the spring. Conversely, when the compressive force is released, the spring 4 provides an initially higher thrust on the piston rod 3 than would be achieved in its absence.

Figure 2:
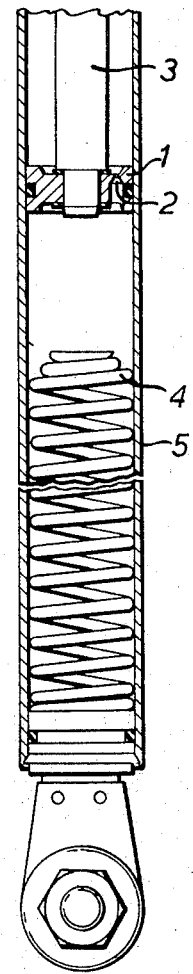
FIG. 2 shows a modified form of the gas spring of FIG. 1.

The construction and operation of the gas spring shown in FIG. 2 is generally similar to that of the spring of FIG. 1 except that the spring 4 is not conical but of constant diameter.

Figure 3:
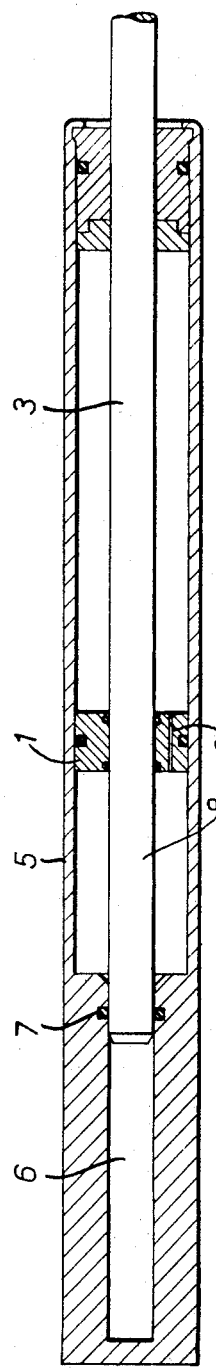
FIG. 3 is a cross-sectional view of another form of gas spring.
Figure 4:
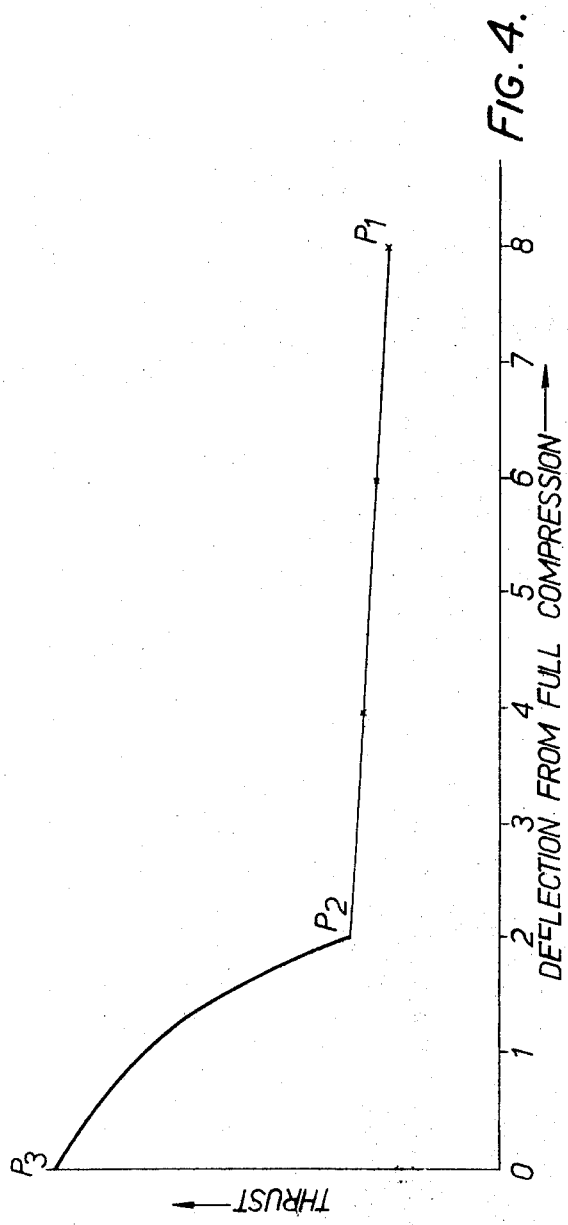
FIG. 4 is a graph illustrating operating characteristics of the gas spring shown in FIG. 3.

In the embodiment shown in FIG. 3, the piston rod 3 has a portion 8 which extends beyond the piston 1 into the cylinder 5. The end of the cylinder 5 is provided with a bore 6 of reduced diameter in which is mounted a seal 7. The operation of the unit is now described with reference to FIG. 4.

On compression, the thrust exerted on the piston rod 3 increases substantially linearly as the pressure varies from $P_1$ (the charge pressure) to $P_2$. At the position corresponding to $P_2$ the piston rod portion 8 enters the bore to effectively form an auxiliary gas spring, and the rate of increase of thrust with rod movement increases because of the extra resistance of the auxiliary gas spring.

Other forms of auxiliary biasing means than those described and illustrated above could, of course be used, such as rubber springs.

I claim:

1. A gas spring comprising a cylinder containing gas under pressure and having a closed end and an open end, a rod extending slidably through the open end of said cylinder, said rod being moveable between a normally fully retracted position within the cylinder and a normally fully extended position, the pressure of the gas in said cylinder acting on the cross-sectional area of said rod to urge it all times towards its normally extended position, means at the outer end of said rod and the closed end of said cylinder for connecting said gas spring between a support and a moveable device for movement of said device from a first position to a second position when said rod is moved to its normally extended position by the pressure of the gas in said cylinder, a piston member connected to the inner end of said rod and slideably engaging the wall of said cylinder, damping orifice means extending through said piston, and a coil spring in said cylinder having one end seated against the closed end of said cylinder and the other end extending freely from said closed end towards said piston a distance such that one of said piston and rod directly engages said spring only during the terminal movement of said rod towards its retracted position to check the same, said spring thereafter providing an initially higher thrust on said rod during its initial movement from its retracted towards its extended position than would be provided by the pressure of the gas alone.

2. A telescopic gas spring according to claim 1, wherein said cylinder has a uniform internal diameter and said spring provides the only mechanical resistance to movement of said piston towards said position of full compression.

* * * * *